J. H. RICHARDS.
ENGINE STARTER.
APPLICATION FILED DEC. 14, 1914.

1,254,851.

Patented Jan. 29, 1918.
4 SHEETS—SHEET 1.

WITNESSES:
Leo. J. Werner.
Edmund DuPont.

INVENTOR.
JULIUS H. RICHARDS.
BY Albion D. T. Libby
ATTORNEY.

J. H. RICHARDS.
ENGINE STARTER.
APPLICATION FILED DEC. 14, 1914.

1,254,851.

Patented Jan. 29, 1918.
4 SHEETS—SHEET 2.

WITNESSES:
Leo J. Werner.
Edmund DuPont.

INVENTOR.
JULIUS H. RICHARDS.
BY Albion D. T. Libby
ATTORNEY.

J. H. RICHARDS.
ENGINE STARTER.
APPLICATION FILED DEC. 14, 1914.

1,254,851.

Patented Jan. 29, 1918.
4 SHEETS—SHEET 4.

WITNESSES:
Leo J. Werner.
Edmund Du Pont.

INVENTOR.
JULIUS H. RICHARDS.
BY
Albion D. T. Libby
ATTORNEY.

UNITED STATES PATENT OFFICE.

JULIUS H. RICHARDS, OF NEWARK, NEW JERSEY, ASSIGNOR TO SPLITDORF ELECTRICAL COMPANY, OF NEWARK, NEW JERSEY.

ENGINE-STARTER.

1,254,851.   Specification of Letters Patent.   Patented Jan. 29, 1918.

Application filed December 14, 1914. Serial No. 877,146.

*To all whom it may concern:*

Be it known that I, JULIUS H. RICHARDS, a citizen of the United States, residing at Newark, county of Essex, and State of New Jersey, have invented certain new and useful Improvements in Engine-Starters, of which the following is a specification.

This invention relates to means for starting internal combustion engines by means of an electric motor, receiving its power from an external source, such as, a storage battery, and also includes means for applying this external source of power to the electric motor and for disconnecting the same therefrom.

One of the objects of my invention is to provide positive means for engaging the starting motor to the engine and to provide quick and efficient means for disconnecting the starting motor from the engine, when the engine begins to operate under its own power.

A further object is to provide means for removing the source of power from the electric motor when the engine begins to operate under its own power, even though the power applying means is still retained in the position which causes the motor to begin its functions, thus effecting a saving in power.

An important feature of my invention is the mounting of the gear which engages the engine on a shaft, which passes through the armature of the electric motor yet is separate therefrom, thus allowing the armature to remain in a permanent position within its field whereby it is always in a position to exert its greatest torque.

By retaining the armature of my electric motor in a fixed position, I am enabled to reduce the length of the commutator and consequently of the whole motor thus reducing the cost of the same, besides getting a more efficient acting device.

Other and further objects of my invention will be readily understood by persons skilled in the art from a consideration of the following description, taken in connection with the drawings, wherein like numerals refer to corresponding parts in the various figures.

Referring now particularly to the drawings, 1 is the frame of the electric motor which carries the exciting field coils, (not shown) 2 is the armature having a commutator 3, both of which are mounted on a hollow shaft 22, which is supported in suitable bearings 23 and 24. Within the armature shaft 22 is a driving shaft 4, having a tapered end 5 upon which is mounted a driving pinion 6, which is held in place on the shaft by the nut 7, or other suitable means. One end of the shaft 4 has splines or spiral keys 25 cut thereon, which engage corresponding spiral grooves in the shaft 22. These splines or keys are cut at a suitable angle, so that as the shaft 4 is moved to the left in Fig. 1, it is given a rotary motion thereby allowing the pinion 6 to find engagement with the teeth cut or attached to the fly-wheel 20 of the engine 26. The teeth on both pinion and fly-wheel are usually beveled on the meeting edges to facilitate the engagement of the gears. 27 is a rocker arm adapted to carry the motor brushes which for the sake of clearness are not shown. 29 and 30 are two collars fastened to the shaft 4 by pins 28 or other suitable means. Between these collars is placed a sleeve 31, which has one side slotted, as at 88 to straddle the shaft 4 there being no splines or keys at this extreme end. The purpose of this sleeve is to provide a simple wearing element which can be quickly replaced in case of necessity. The electric motor is adapted to be mounted on the support 8 by the bolts 9 and the support 8 in turn is attached to the engine frame 11, by bolts 10. Attached to one end of the field frame of the motor is an end bearing plate 13, which is adapted to be bolted to the engine case 21, by bolts 12. The other bearing plate 14 carries a commutator housing 89, as well as two projecting supports 15, upon which is pivoted by bolt 32, a lever 33. The lower end of this lever has two forks 34, through which pass pivot bearing screws 35, that extend into the sleeve 31. To the upper end of the lever 33 is pivoted by the bolt 36, two links 37 and these links in turn are connected with the pawl 40 by a pivot member 38, which passes through the hole 39. The pivot member 41 passes through the hole 42 of the pawl 40 and rests in two holes 43, in the supports 44 of the pawl carrier 45, which in turn is carried by rods 81 and 82 rigidly secured to the end plate 14. These rods pass through holes 46 in such a manner as to afford an easy sliding fit. The pawl 40 is inclosed in and guided by a slot or groove 47 in the pawl carrier 45 and the end engaged by the links 37 is given an upward set by a resilient member 48, which is set in a pocket 49. The purpose of this will be explained later.

Mounted on the top of the motor frame 1 is a casing 17 which incloses a switch for operating the motor. The casing is adapted to be covered by the cover 18 held in place by screws 19. Attached to one wall of the casing is an insulating block 50 having connecting studs 51 and 52. Stud 51 is connected to a switch blade 53 and the stud 52 is connected to the switch blade 54. Passing through the box 17 is a rod 55, having an adjustable end 56, which is adapted to be connected to intermediate connecting levers which run to some convenient point near the driver's seat. These intermediate levers are no part of my invention and therefore, are not described further, they being well understood.

Around the rod 55 is spring 57 which extends from the block 50 to a contact 58, which is securely fastened to the rod by pin 59, or other suitable means. The contact element 58 and pin 59 are insulated from the rod. Alongside of this rod is another parallel rod 60, having a spring 61 around it, and a block 62 held securely to the rod by pin 63. Both the block and the pin are insulated from the rod 60. While I have shown the blocks 58 and 62 as solid pieces, they may be constructed in any other suitable manner, it being essential, however, that they be made of good conducting material, such as copper. The switch blades 53 and 54 are likewise preferably made of spring copper.

The rod 60 is continued outside of the box and passes through the hole 64 in the projection 65 of the pawl carrier 45. This projection is slotted as at 66 and screws 67 pass through the holes 68 for the purpose of drawing the two limbs of the projection 65 together, in order that the pawl carrier 45 may be clamped securely to the rod 60. It will now be seen that as the rod 60 moves back and forth in a manner which will later be described, the pawl carrier 45 travels with it.

Figure 3:
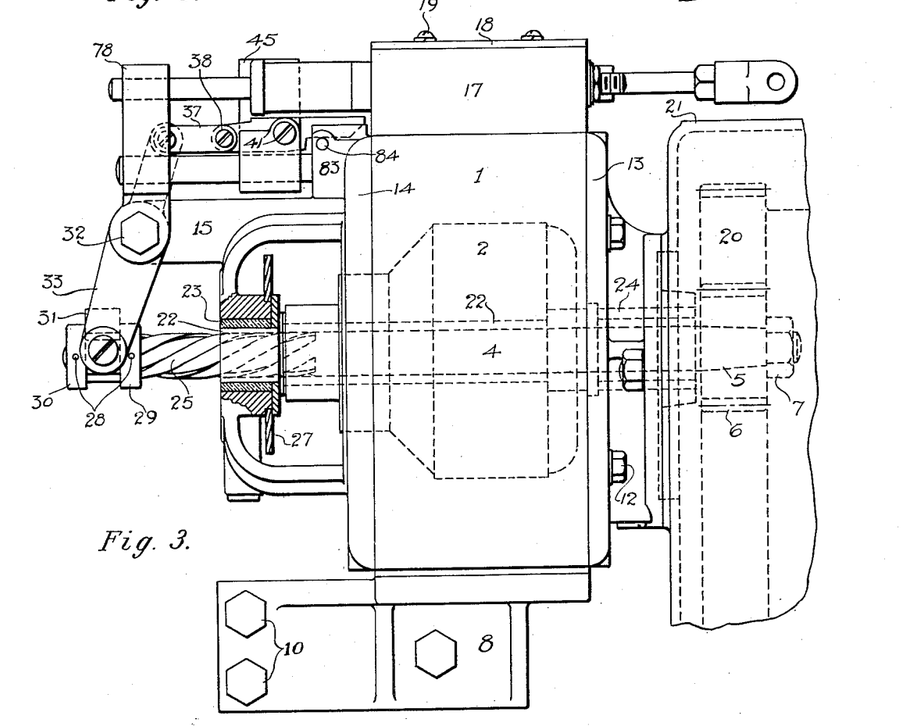
Fig. 3 is a similar view of Fig. 1, except the electric motor is shown in the position of cranking the engine.

The rod 55 also projects from the box 17 and has two collars 69 and 70 fastened thereto as by pins 71 and 72. Between the collars is mounted a cup like sleeve 73, having a bottom 74, upon which rests a spring 75, the other end of which is held against the collar 70. The assembled parts 69 to 75 inclusive, which have just been described, I will designate as the pawl clutch 76. The rod 55 is continued beyond the pawl clutch 76 and passes through a hole 77 in the stirrup member 78, which serves as an end support and guide for the rod. The stirrup member 78 is braced by the rods 81 and 82, which pass through the holes 79 and 80 in the two arms of the stirrup, which has its primary bearing on the rod 32 passing through the supporting arms 15. Passing through two spaced lugs 83 that are cast integral with the end plate 14, is a pin 84, adapted to engage the beveled nose 85 of the pawl 40 as shown in Fig. 3, the purpose of which will be set forth later.

Figure 1:
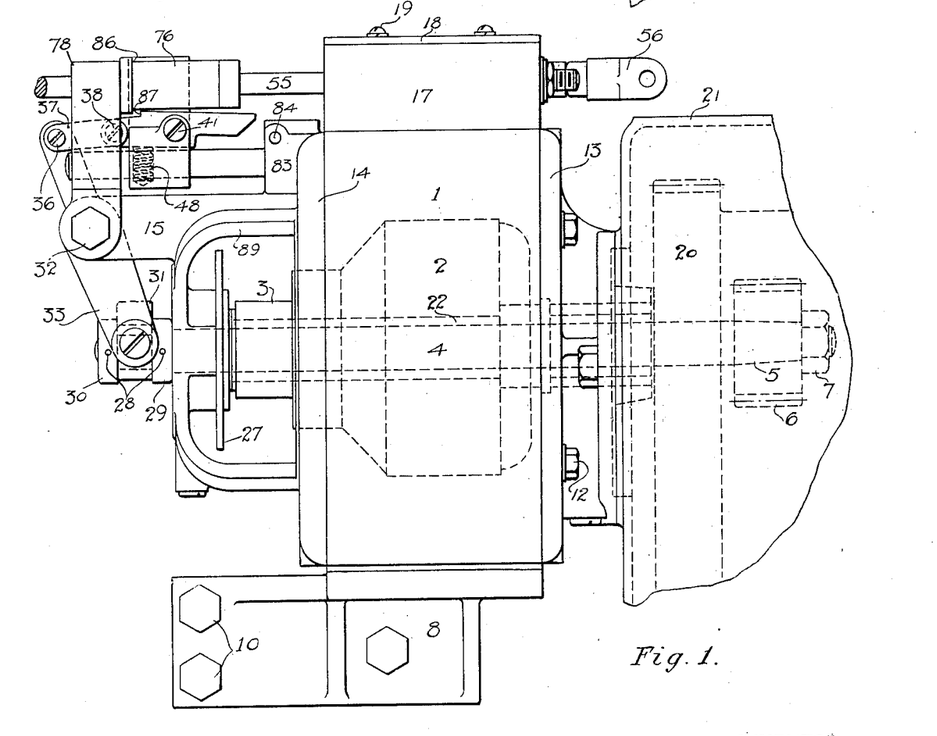
Figure 1 is a side elevation of the electric motor, preferably of the series type, and switching means together with a section of the engine, which is to be engaged by the motor.

I will now describe the operation of the combination of the various parts that have been particularly described. Suppose the internal combustion engine 26 should be idle, and likewise the electric motor, and the other apparatus associated therewith all in the position as shown in Fig. 1. The intermediate lever or levers running to the driver's seat (not shown) are operated in such a manner as to produce a pull on the adjustable member 56, attached to the rod 55. The pawl clutch 76 will be moved to the right and the shoulder 86 of the sleeve 73 will engage the shoulder 87 of the pawl 40 which is tilted upward by the spring 48. The pawl carrier 45 will be moved to the right along with the rod 55, brush rod 60 being also moved along with it and the two contact blocks 58 and 62 are held together. At the same time, the forked member 33 is rotated on its bearing support 32, through the intermediate connection of the links 37 and the driving shaft 4 will be drawn to the left. On account of the spiral keys 25 in the end of the shaft, a rotary motion will be imparted to the pinion 6 for the purpose already described.

Figure 11:
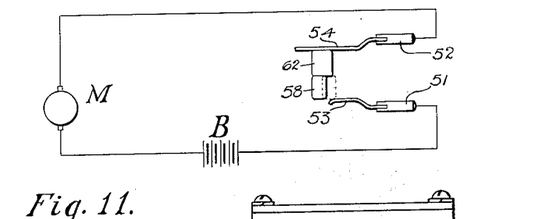
Fig. 11 is a diagram of the electrical circuit, including the switching mechanism, the motor and the source of power, said circuit being shown in dotted lines in a closed position.
Figure 12:
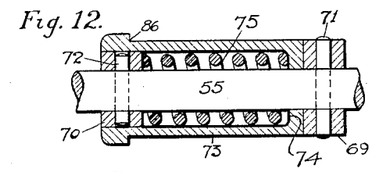
Fig. 12 is a sectional view of one of the switching elements.

Should a tooth of the pinion meet a tooth of the fly-wheel, either of which for any reason has become "burned" on the edge, the tendency will be to hold the gears out of mesh and under this condition the collar 69, of the pawl clutch 76, will be drawn away from the sleeve 73. At the same time the spring 75 will be compressed by means of the collar 70, thereby storing up a force against the sleeve 73 and the pawl 40, and acting in the direction of the force applied to the rod 55. At the time the gears are going into engagement or in case of meeting an obstruction, as above set forth, the switch contacts 58 and 62 are substantially in the position shown in full lines in Fig. 11. When an obstruction is encountered, the contact 62 will stop temporarily but 58 will continue on and make contact with blade 53, closing the battery circuit through the motor. The motor armature 2 will now begin to turn and the tooth or teeth before referred to of the pinion will be moved away from the tooth or teeth of the fly-wheel. The instant the obstruction is passed, on account of the force acting on the rod 55, and the additional force stored in the resilient member 75, the shaft 4 will be drawn quickly to the left and the pinion will be drawn home into engagement with the fly-wheel 20 and the member 73 of the pawl clutch 76 will come back against the collar 69.

Figure 4:
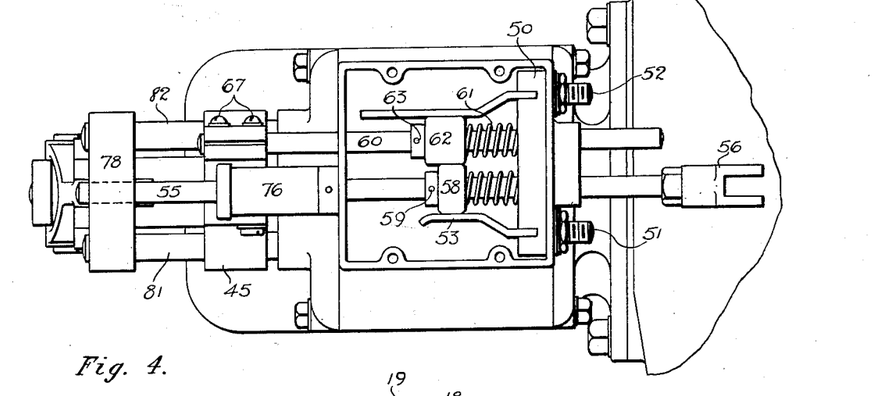
Fig. 4 is a top plan view of Fig. 3.
Figure 5:
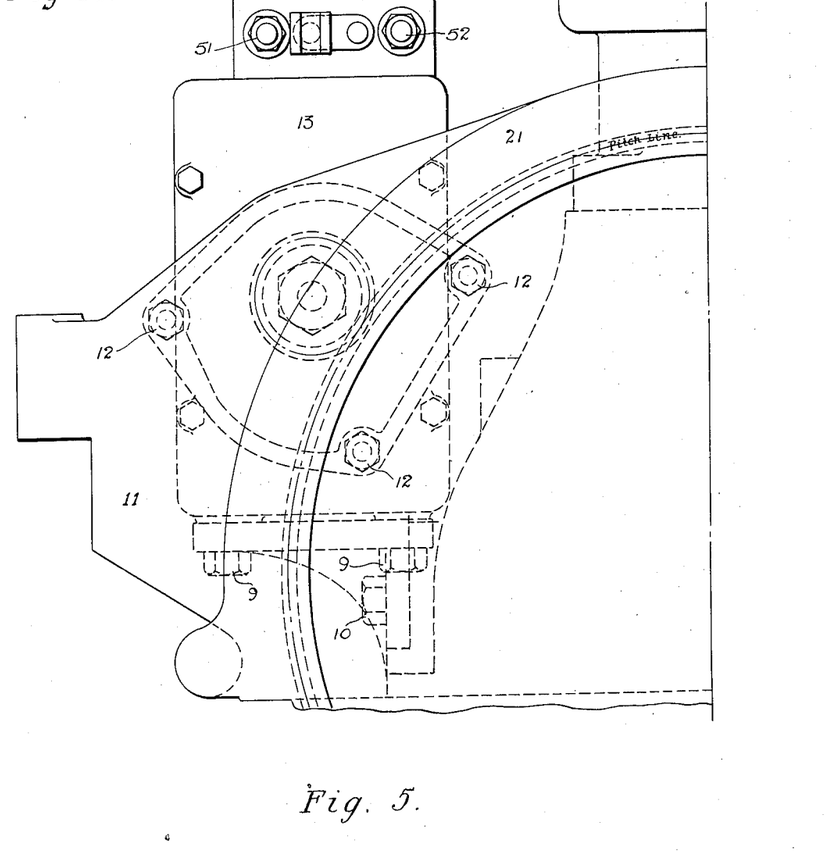
Fig. 5 is an end view showing a portion of the engine with its fly-wheel and supporting frame to which the electric motor is attached.
Figure 6:
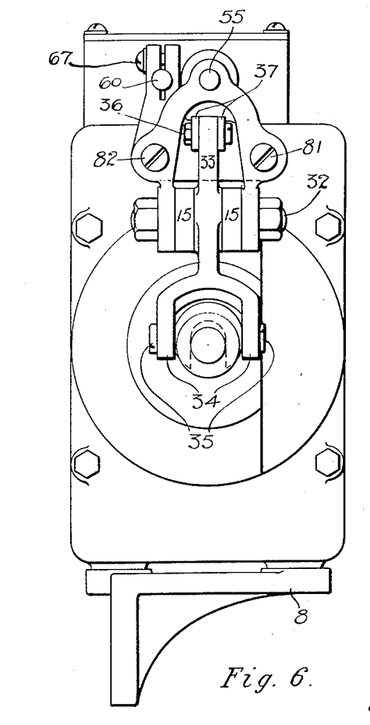
Fig. 6 is an end view of Fig. 1.
Figure 7:
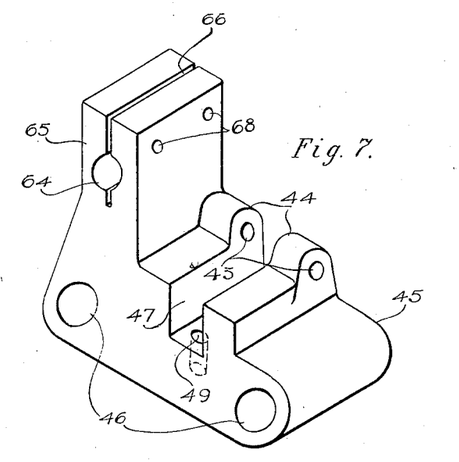
Fig. 7 is a perspective view of one of the elements comprising the switching means used with the motor.
Figure 8:
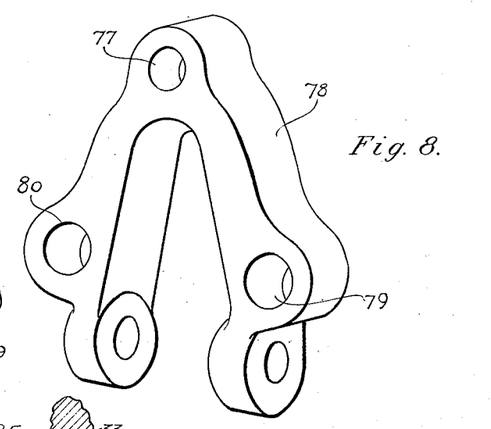
Fig. 8 is a perspective view of another element of the switching device.
Figures 9, 10:
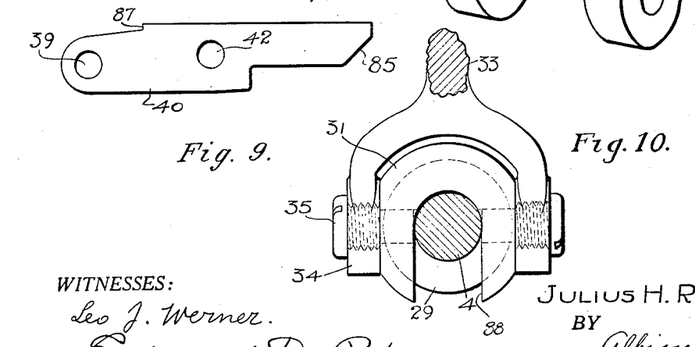
Fig. 9 is a side view of another element of the switching device.
Fig. 10 is a view of the engaging means between the shaft used for cranking the engine and the switching device.

Further movement of the rod to the right causes the nose of the pawl 85 to engage with the pin 84 and the nose of the pawl will be lifted upward and the shoulder 87 released from the shoulder 86 of the pawl clutch sleeve member 73 and the switch contact blocks 58 and 62 will be drawn to their full working position as shown in Fig. 4, while the collar 69 reaches a stop shown at the side of the switch box 17. It will be noted here that the block 62 is longer than block 58 in order to take up for the compensating movement of the pawl clutch member 76, just described, whereby the contacts will always remain closed and in contact with switch blades 53 and 54. The position of switch block 58 when the compensating feature takes place is shown in dotted line in Fig. 11.

I come now to a very important part of my invention, which is the automatic feature of disengaging the electric motor from the engine and for disconnecting the source of energy from the electric motor itself.

With the parts, as shown in Figs. 3 and 4, the electric motor will crank the engine and as soon as the engine "picks up" from its own power, it will immediately begin to turn the fly-wheel 20 faster than it is being turned by the pinion 6 and on account of the spiral keys 25, heretofore described the driving shaft 4 will be pulled to the right, back to its normal position, as shown in Fig. 1. This action, through the intermediate members, also heretofore described, will draw the pawl carrier 45 back to the position of Fig. 2. The contact block 62 will also be carried back to the position in Fig. 2, and assuming that the driver is still holding the rod 55 in its fully operated position, that of Fig. 4, and remembering that the block 58 is in the position in Fig. 4, it will be seen that the circuit to the electric motor is open and the power is thereby cut off. It is thus seen that two acts are performed by the starting engine, namely, the disengaging of the electric motor from the engine, and also the disengagement of the electric motor from the power. It is also seen that even though the operator hold on to his starting lever, no further consumption of the current takes place, as this has been cut off and the motor armature stopped. Hence a minimum amount of power is taken by the act of cranking the engine.

Figure 2:
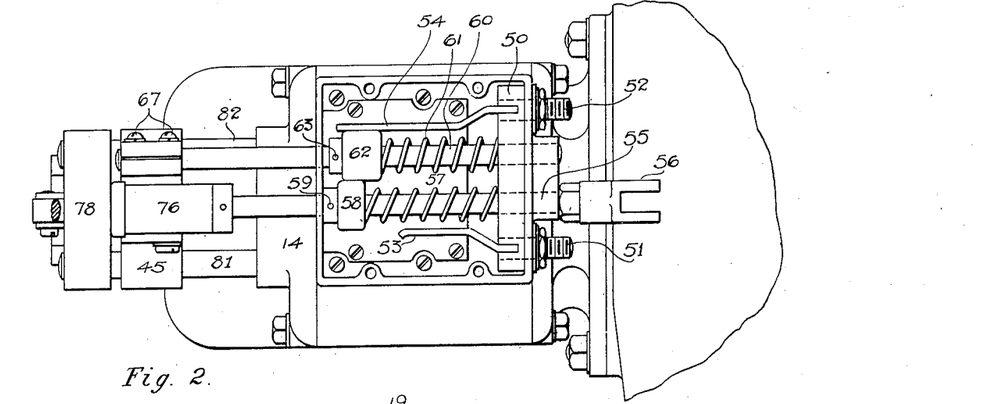
Fig. 2 is a top plan view of Fig. 1.

Should for any reason there be something the matter with the engine that it does not start, the parts remain in the position as in Fig. 3 with the exception of rod 55, which on being released, returns to the position of Fig. 2, through the action of spring 57, thereby opening the circuit to the electric motor and stopping the action of cranking. As soon as the trouble has been fixed, the rod 55 can be pulled directly to the position in Fig. 4 and the electric motor is started and disengagement will take place as previously described.

I am aware that it is old to use a spiral gear on the fly-wheel and an engaging pinion having a corresponding gear for the purpose of securing automatic release. The spiral gears are more expensive than the ordinary spur gear and I cut out this item of expense. I am also aware that it is old to move the entire armature having a pinion connected on the end of the shaft but this is open to the objections previously set forth and in my construction, I am enabled to accomplish the result at a minimum expense and in the shortest time possible.

On account of my method of engaging the motor with the engine, it is not necessary to use a resistance in the armature circuit of the motor, as is generally done for the purpose of making it turn slowly, during the time of engagement. This resistance very often burns out and causes more or less trouble and I do away with this source of annoyance. Also on account of the manual operation as set forth, I prevent clashing of gears during the starting operation.

I may put the spiral keys on the two shafts on the opposite end from that shown and I may arrange the switching mechanism and interconnecting parts with the driving shaft in a number of different ways; but all such changes would be mere equivalents of what I have shown in my drawings attached hereto and I believe would come within the scope of the appended claims.

Having thus described my invention, what I claim is:

1. In apparatus of the class described, the combination of an engine, an electric motor having an armature, a source of power for said motor and switching mechanism for applying said source of power to said motor, said motor having two shafts one within the other, the outer shaft serving as a support for the inner shaft, and means whereby any rotation of one produces a corresponding rotation of the other of said shafts, one of said shafts being adapted to be connected to said engine and the other of said shafts having said motor armature mounted thereon, said means serving also to break said connection between the said shaft and said engine, substantially as and for the purpose described.

2. In apparatus of the class described, the combination of an engine member, a source of power, a motor having a hollow armature shaft, a second shaft arranged within said hollow shaft and drivingly connected thereto, means for manually moving said second shaft longitudinally with respect to said hollow shaft into driving engagement with the engine member, means on each of the said shafts coöperating to effect an automatic disengagement of said second shaft from the engine member, and means operated in connection with the first said means for applying said source of power to the motor armature.

3. In apparatus of the class described, the combination of an engine, a rotatable member driven by said engine, a source of power, a rotatable member driven by said source of power, a third rotatable member within the second and having a permanent driving engagement therewith, and means manually operable for causing the third rotatable member to have relative rotation with respect to the second member whereby both members are brought into working engagement with the rotatable member driven by said engine, as and for the purpose described.

4. The combination of an engine, a series wound starting motor, normally disengaged engine operating means, a storage battery to energize said motor, switching mechanism adapted to close the circuit from the battery to the motor whereby the motor armature is energized and means passing through the motor armature and operated by said switching mechanism for causing the engine operating means to engage with said engine, and means for driving the engine operating means from said motor armature, substantially as and for the purpose described.

5. In apparatus of the class described, the combination of an engine driven member, an electric motor having a hollow armature shaft and bearings therefor, a driving shaft within said armature shaft, a source of power for said motor and means for connecting said source of power to said motor armature, driving means in permanent driving engagement between said two shafts, and means operated by the first mentioned means for connecting the driving shaft to said engine driven member, substantially as described.

6. In apparatus of the class described, in combination, an engine, a member driven by said engine, a source of power, two rotatable members one within the other and drivingly connected at all times, means for moving the inner one of said rotatable members into engagement with said first member, the driving connection between said two rotatable members serving as a means to disengage the inner rotatable member from said engine member, electrical windings on the outer of said two rotatable members, said source of power being adapted to be connected to said windings to start said engine.

7. In apparatus of the class described, in combination, an engine, a member driven by said engine, a source of power, a rotatable armature and means for applying the source of power thereto, a hollow shaft for supporting said armature, bearings for said hollow shaft, an inner shaft within said hollow shaft, means for engaging said inner shaft with said engine member, means for holding said inner shaft in engagement therewith while rotating said engine member, said means also serving to effect the release of said inner shaft from said engine member at a predetermined speed of the latter.

8. In apparatus of the class described, in combination, an engine, a member driven by said engine, a source of power, two rotatable members one within the other and drivingly connected, mechanical means brought into operation before the source of power for moving longitudinaly one of said rotatable members into engagement with said engine driven member without longitudinal movement of the other of said rotatable members, and means on each of said two rotatable members coöperating to automatically break the engagement between the said rotatable member and the engine driven member, said source of power being adapted to operate the last mentioned rotatable member to start said engine.

9. In apparatus of the class described, in combination, an engine, a member driven by said engine, a source of power, two rotatable members one within the other and drivingly connected, means for moving longitudinally the inner one of said rotatable members into engagement with the first member without longitudinal movement of the outer of said rotatable members, coöperating means on said rotatable members to automatically move the inner one out of engagement with said engine member, said source of power being adapted to operate the other of said two rotatable members to start said engine.

10. In apparatus of the class described, in combination, an engine, a member driven by said engine, a source of power, a rotatable armature and means for applying the source of power thereto, a hollow shaft for supporting said armature, bearings for said hollow shaft, an inner shaft within said hollow shaft, means for moving said inner shaft longitudinally to cause engagement of the same with said engine member, means common to both of said shafts for holding the inner shaft in engagement with said engine driven member while the same is being rotated, said means also serving to effect the release of said inner shaft from the said engine member at a predetermined speed of the latter.

11. In apparatus of the class described, in combination, an engine, a rotatable member driven by said engine, an electric motor having an armature supported on a hollow shaft, bearings for said shaft, a second shaft supported within said hollow shaft, a driving gear on one end of said second shaft, collars on the other end of said shaft and a bearing sleeve therebetween, a switch mounted on the top of said motor, means interconecting said switch and said bearing sleeve whereby when said switch is operated said driving gear is connected with said rotatable member on said engine.

12. In apparatus of the class described, in combination, an engine, a rotatable member driven by said engine, an electric motor having an armature supported on a hollow shaft, bearings for said shaft, a second shaft supported within said hollow shaft, a driving gear on one end of said second shaft, collars on the other end of said shaft and a bearing sleeve therebetween, a switch on the top of said motor, said switch having a main pull rod, a bearing outside of said switch for said pull rod, supports attached to said motor and forming a support for the said pull support, a clutch member carried by said pull rod, a dog adapted to be engaged by said clutch member, a lever connected to said dog, one end of said lever being pivoted to said bearing sleeve, whereby when the pull rod is operated, said driving gear is caused to engage the rotatable member on said engine.

13. In apparatus of the class described, in combination, an engine, a member driven by said engine, a source of power, two rotatable members one within the other and drivingly connected at all times, manually operable means for moving longitudinally the inner one of said rotatable members into engagement with said first member without longitudinal movement of the outer of said rotatable members, said manually operable means also serving to connect the source of power with the other of said two rotatable members to start said engine.

14. In apparatus of the class described, in combination, an engine, a rotatable member driven by said engine, an electric motor having an armature supported on a hollow shaft, bearings for said shaft, a second shaft supported within said hollow shaft and in permanent driving relation thereto, a driving gear on one end of said second shaft, engaging means on the other end of said shaft, a switch, means interconnecting said switch and said engaging means whereby when said switch is operated, said driving gear is connected with said rotatable member on said engine.

15. In apparatus of the class described, in combination, an engine, a rotatable member driven by said engine, an electric motor having an armature supported on a hollow shaft, bearings for said shaft, a second shaft supported within said hollow shaft, a driving gear on one end of said second shaft, spiral keys on one of said shafts and spiral keyways on the other of said shafts, adapted to receive said spiral keys on the first mentioned shaft, engaging means on the end of said inner shaft, a switch, means interconnecting said switch and said engaging means, whereby when said switch is operated, said driving gear is connected with said rotatable member on said engine.

16. In apparatus of the class described, in combination, an engine, a rotatable member driven by said engine, an electric motor having an armature supported on a hollow shaft, bearings for said shaft, a second shaft supported within said hollow shaft, driving gear on one end of said second shaft, spiral keys on the inner shaft, spiral keyways for said keys in the inner portion of said hollow shaft, engaging means attached to one end of the inner shaft, a switch, interconnecting means between said switch and said engaging means, whereby when said switch is operated said driving gear is connected with said rotatable member on said engine.

17. In apparatus of the class described, in combination, an engine, a rotatable member on said engine, an electric motor having an armature supported on a hollow shaft, bearings for said shaft, a second shaft supported within said hollow shaft, a driving gear on one end of said second shaft, spiral keys on one of said shafts, spiral keyways in the other of said shafts in which said keys operate, a switch, interconnecting means between said switch and said inner shaft, serving to move the said inner shaft when the switch is operated to cause engagement of said driving gear with said rotatable member on said engine, said spiral keys and keyways serving to hold said gear in engagement with said rotatable member while it is being rotated and further serving to effect the release of said gear from said engine member at a predetermined speed of the latter.

18. In apparatus of the class described, in combination, an engine, a rotatable member on said engine, an electric motor having a shaft projecting at both ends therefrom, a gear wheel on one of said projecting ends, a switch box attached to the top of said motor, a switch rod passing through said box, connecting devices adapted to connect one end of said switch rod to one end of said motor shaft, whereby when a pull is applied to the end of said switch rod, said gear is caused to engage the rotatable member on said engine.

19. In apparatus of the class described, in combination, an engine, a rotatable member on said engine, an electric motor having a shaft projecting at both ends of the casing, a gear wheel on one end of said shaft, a switch member, connecting devices between one end of said member and one end of said shaft, the other end of said switch member adapted to be engaged by an outside force whereby when said switch member is moved said gear wheel is caused to engage said fly wheel.

20. In apparatus of the class described, in combination, an engine, a rotatable member on said engine, an electric motor having shaft extensions on both ends, a gear wheel on one of said shaft extensions, a switch casing, a slidable member passing therethrough, connecting devices connecting one end of said slidable switch member to one of said shaft extensions, an adjustable member on the other end of said slidable switch member adapted to have a force applied thereto whereby movement of the slidable switch member causes said shaft to move longitudinally to engage the said gear with the rotatable member on said engine.

21. In apparatus of the class described, in combination, an engine, a rotatable member on said engine, an electric motor having an armature supported on a hollow shaft, bearings for said shaft, a second shaft supported within said hollow shaft and extending beyond the motor casing at both ends and adapted to move horizontally, driving means between said shafts, said driving means adapted to give relative rotary movement between the shafts, a gear wheel on one of said shaft extensions, a switch having a slidable member, connecting devices between one end of said slidable member and one of said shaft extensions, the other end of said slidable member being adapted to have a force applied thereto, whereby said slidable member when moved causes said inner shaft to move horizontally and rotatably for the purpose of engaging said gear wheel with said rotatable member on said engine.

22. In apparatus of the class described, in combination, an engine, a rotatable member on said engine, an electric motor having an armature supported on a hollow shaft, bearings for said shaft, a second shaft supported within said hollow shaft, said inner shaft extending at both ends beyond the motor frame, keys in one of said shafts and corresponding keyways on the other of said shafts, a gear mounted on one of said shaft extensions, a battery, a switch having fixed switch blades and connecting blocks mounted on slidable members, a pawl clutch carried on one of said members, a pawl carried by the other of said members, a connecting lever between said pawl and one of the shaft extensions, means for connecting said lever to said shaft extension, said pawl adapted to engage said pawl clutch when the sliding member on which it is mounted is moved, said switch blocks being arranged to close the circuit from said source of power through said armature, whereby the said gear is engaged with the rotatable member on said engine and said engine is started, substantially as and for the purpose described.

23. In apparatus of the class described, in combination, an engine, a member driven by said engine, two rotatable members one within the other and rotatably connected, a gear wheel on one of said rotatable members, a source of power, a switch having two slidable members carrying switch contacts adapted to close a circuit between said source of power and one of said rotatable members, a compensating device carried on one of said slidable members, a support carrying a pawl attached to the other of said slidable members, a lever, links connecting said lever to said pawl, the other end of said lever being connected to the rotatable shaft carrying the said gear wheel, said pawl being normally in a position to engage said compensating device and means for releasing said pawl from engagement therewith after said gear wheel has been engaged with said engine driven member, whereby said slidable member, switch, contact and compensating device can return to their normal positions after having been moved to full operating position, thereby removing said source of power from said rotatable member, if said engine does not start.

24. In apparatus of the class described, in combination, an engine, a member driven by said engine, a source of power, an electric motor having a rotatable armature, a hollow shaft for said armature, bearings for said shaft, a second shaft passing through said hollow shaft and extending beyond the motor casing at both ends, driving means between said shafts, a gear wheel on one of said shaft extensions, switching mechanism mounted on said motor and connected to the other of said shaft extensions and adapted to be moved to cause said gear wheel to engage said engine driven member, then to connect said source of power to said motor, substantially as described.

25. In apparatus of the class described, in combination, an engine, a member driven by said engine, a source of power, an electric motor having a shaft extending at both ends, a gear wheel on one of said extensions, a switch, connecting devices between said switch and the other shaft extension, said switch being adapted when moved to cause said motor shaft to move whereby said gear wheel is engaged with the engine driven member and also to close the circuit between said source of power and said motor, and further acting to open the circuit between the motor and source of power when said engine starts under its own power, substantially as described.

26. In apparatus of the class described, in combination, an engine, a rotatable member driven by said engine, an electric motor having an armature supported on a hollow shaft, bearings for said shaft, a second shaft supported within said hollow shaft and adapted to move horizontally, a driving gear on one end of said second shaft, engaging means on the other end of said shaft, a switch, means connecting said switch to said engaging means, driving means between said hollow and inner shafts, said driving means adapted to give relative rotary movement between the shafts, whereby when said switch is operated a longitudinal and rotatable motion is imparted to said inner shaft to cause the said driving gear to engage with the rotatable member driven by said engine.

27. In apparatus of the class described, in combination, an engine, a rotatable member driven by said engine, an electric motor having an armature supported on a hollow shaft, bearings for said shaft, a second shaft supported within said hollow shaft, a driving gear on one end of said second shaft, engaging means on the other end of said shaft, a switching device and means connecting said switching device to said engaging means, a source of power, means connecting said hollow and inner shafts whereby when said switching device is operated, said inner shaft is rotatably and longitudinally moved to carry said gear into engagement with said rotatable member driven by said engine, and further, closing the circuit of said source of power to said motor to start said engine.

28. In apparatus of the class described, in combination, an engine, a rotatable member driven by said engine, an electric motor having an armature supported on a hollow shaft, bearings for said shaft, a second shaft within said hollow shaft, a driving gear on one end of said second shaft, engaging means on the other end of said shaft, a switching device and means connecting said switching device to said engaging means, a source of power, means connecting said hollow and inner shafts whereby when said switching device is operated, said inner shaft is rotatably and longitudinally moved to carry said gear into engagement with said rotatable member driven by said engine, and further, closing the circuit of said source of power to said motor to start said engine, said connecting means between said two shafts serving also to disconnect said gear from said engine driven rotatable member, when the engine reaches a predetermined speed.

29. In apparatus of the class described, in combination, an engine, a rotatable member driven by said engine, an electric motor having an armature supported on a hollow shaft, bearings for said shaft, a second shaft supported within said hollow shaft, a driving gear on one end of said second shaft, engaging means on the other end of said shaft, a switching device and means connecting said switching device to said engaging means, a source of power, means connecting said hollow and inner shafts whereby when said switching device is operated, said inner shaft is rotatably and longitudinally moved to carry said gear into engagement with said rotatable member driven by said engine and further, closing the circuit of said source of power to said motor to start said engine, said connecting means between said two shafts serving also to disconnect said gear from said engine driven rotatable member, said means also serving to remove said source of power from said electric motor when said engine starts.

30. In apparatus of the class described, in combination, an engine, a member driven by said engine, an electric motor having a shaft projecting at both ends of its casing, a driving gear on one of said projecting ends, switch engaging means on the other of said projecting ends, a switch having a pull rod, one end of said pull rod being connected to said engaging means and carrying a compensating device, a secondary rod for said switch, a pawl carried by said second rod, said pawl adapted to engage said compensating device, a source of power for said electric motor, said pull rod acting to move said motor shaft to cause the driving gear to engage said engine driven member, said compensating device allowing said pull rod to continue in its path of movement when movement of said driving gear is obstructed and further allowing said pull rod to continue in its movement to close the circuit of said source of power to said motor, whereby said shaft is rotatably turned to move said gear into engagement with said engine driven member.

31. In apparatus of the class described, in combination, an engine, a member driven by said engine, an electric motor having a shaft projecting at both ends of its casing, a driving gear on one of said projecting ends, switch engaging means on the other of said projecting ends, a switch having a pull rod, one end of said pull rod being connected to said engaging means and carrying a compensating device, a secondary rod for said switch, a pawl carried by said second rod, said pawl adapted to engage said compensating device, a source of power for said electric motor, said pull rod acting to move said motor shaft to cause the driving gear to engage said engine driven member, said compensating device allowing said pull rod to continue in its path of movement when movement of said driving gear is obstructed and further allowing said pull rod to continue in its movement to close the circuit of said source of power to said motor, whereby said shaft is rotatably turned to move said gear into engagement with said engine driven member, said compensating device returning to its normal condition after said gear is engaged with said engine driven member and serving as a stop for said pull rod.

32. In apparatus of the class described, in combination, an engine, a member driven by said engine, an electric motor having a shaft projecting at both ends of its casing, a driving gear on one of said projecting ends, switch engaging means on the other of said projecting ends, a switch having a pull rod, one end of said pull rod being connected to said engaging means and carrying a compensating device, a secondary rod for said switch, a pawl carried by said second rod, said pawl adapted to engage said compensating device, a source of power for said electric motor, said pull rod acting to move said motor shaft to cause the driving gear to engage said engine driven member, said compensating device allowing said pull rod to continue in its path of movement when movement of said driving gear is obstructed and further allowing said pull rod to continue in its movement to close the circuit of said source of power to said motor, whereby said shaft is rotatably turned to move said gear into engagement with said engine driven member, said compensating device returning to its normal condition after said gear is engaged with said engine driven member and serving as a stop for said pull rod, and means for releasing said pawl from the path of engagement of the said compensating device, whereby said pawl can return to its normal position when said engine is started.

33. In apparatus of the class described, in combination, an engine, a member driven by said engine, an electric motor having a shaft projecting at both ends of its casing, a gear wheel on one of said shaft projections, a source of power for said motor, a switching mechanism adapted to be connected to one of said shaft projections, said switching mechanism when operated causing said projecting shaft to move axially, thereby carrying said gear wheel toward engagement with said engine driven member and further serving to apply, after a predetermined interval of time, the said source of power to said motor should said gear wheel meet with obstruction in its path of engagement with said engine driven member, substantially as described.

34. In combination, a nonself-starting engine, a self starting motor having two shafts one of which is adapted to be connected to said engine, a source of power for said motor, switching mechanism for connecting one of said shafts to said engine and said power to said motor by moving said shaft axially, a compensating device associated with said switching mechanism whereby a part of said mechanism may move independent of the other parts to apply power to said motor should said shaft in being connected to said engine meet with an obstruction, for the purpose described.

35. In combination, a nonself-starting engine, a self starting motor having two shafts one within the other, one of which is adapted to be connected by axial movement thereof to said engine, a source of power for said motor, switching mechanism for connecting one of said shafts to said engine and said power to said motor, a compensating device associated with said switching mechanism whereby a part of said mechanism may move independent of the other parts to apply power to said motor should said shaft in being connected to said engine meet with an obstruction, for the purpose described.

36. In combination, a nonself-starting engine, a self starting motor having two shafts one within the other, the inner of said shafts being adapted to be connected by axial movement thereof to said engine, a source of power for said motor, switching mechanism for connecting the inner of said shafts to said engine and for connecting said power to said motor, a compensating device associated with said switching mechanism whereby a part of same may move independent of the other parts to apply power to said motor should said inner shaft meet with an obstruction in being connected to said engine, for the purpose described.

37. In apparatus of the class described, in combination, an engine, a member driven by said engine, two rotatable members one within the other rotatably connected, a gear wheel drivingly carried on one of said rotatable members but operatively connected to the other of said rotatable members, an armature winding carried on the other of said two rotatable members, a source of power, a switch having two slidable members carrying switch contacts adapted to close the circuit between said source of power and said armature winding, a compensating device carried on one of said slidable members, a carrier supporting a pawl attached to the other of said slidable members, said carrier being connected to the rotatable shaft in operative relation to the gear wheel, said pawl being normally in a position to engage said compensating device, means for releasing said pawl from engagement thereto after said gear wheel has been engaged by said engine driven member, whereby said slidable member, switch contact and compensating device are returned to their normal position, after having been moved to full operative position, thereby removing said source of power from said rotatable member if said engine does not start.

38. In an apparatus of the class described, in combination, an engine, a member driven by said engine, two rotatable members one within the other rotatably connected, a gear wheel drivingly carried on one of said rotatable members but operatively connected to the other of said rotatable members, a source of power, a switch having two slidable members carrying switch contacts, a compensating device carried on one of said slidable members, a carrier supporting a pawl attached to the other of said slidable members, said carrier being connected to the rotatable shaft in operative relation to the gear wheel, said pawl being normally in position to engage said compensating device, said compensating device being adapted to allow the slidable member on which it is carried, to move to close the circuit between the said source of power and one of said rotatable members should said gear wheel when operatively moved, meet with an obstruction.

In testimony whereof I affix my signature in the presence of two witnesses.

JULIUS H. RICHARDS.

Witnesses:
HELEN B. POOLE,
M. W. BARTLETT.